United States Patent

Tsuneishi et al.

[11] 3,862,490
[45] Jan. 28, 1975

[54] METHOD OF JOINING THE EDGE PORTIONS OF TWO SHEETS

[75] Inventors: Norihiro Tsuneishi; Yoshiyuki Miyabayashi; Hiroyuki Aida; Hideo Takizawa, all of Tokyo, Japan

[73] Assignee: Nissan Motor Company, Limited, Yokohama, Japan

[22] Filed: Jan. 29, 1974

[21] Appl. No.: 437,716

[30] Foreign Application Priority Data
Jan. 31, 1973 Japan.......................... 48-13527[U]

[52] U.S. Cl.................... 29/505, 29/521, 113/116 C
[51] Int. Cl......................... B21d 39/00, B23p 11/00
[58] Field of Search ............ 29/463, 462, 509, 512, 29/513, 521, 505; 113/116 C, 116 F, 116 R, 113/118 R, 1 N

[56] References Cited
UNITED STATES PATENTS

| | | |
|---|---|---|
| 1,796,114 | 3/1931 | Meadowcroft.................. 113/116 D |
| 1,808,561 | 6/1931 | Ledwinka....................... 113/116 C |
| 3,680,910 | 8/1972 | Stanner............................ 29/513 X |
| 3,719,986 | 3/1973 | Ardolino et al.................. 29/521 X |

*Primary Examiner*—C. W. Lanham
*Assistant Examiner*—Victor A. DiPalma
*Attorney, Agent, or Firm*—Robert E. Burns; Emmanuel J. Lobato; Bruce L. Adams

[57] ABSTRACT

An edge portion of one sheet is formed with elongated slots and a raised portion between each slot and the edge of the sheet. The two sheets are then placed together so that an edge portion of the other sheet extends beyond the edge portion of the one sheet. The edge portion of the other sheet is folded back over the edge portion of the one sheet so that the raised portions are flattened and sections of the edge portion between the raised portions and the edge are deformed to fill a gap between the edge of the one sheet and the folded end of the other sheet. Excess deformation is absorbed by deformation of other sections of the edge portion of the one sheet into the slots.

2 Claims, 5 Drawing Figures

3,862,490

METHOD OF JOINING THE EDGE PORTIONS OF TWO SHEETS

The present invention relates to a method of joining the edge portions of two sheets without using supplementary means such as mechanical fasteners, metal-to-metal adhesives or welding techniques.

Sheet metal members are often joined by a lock joint which is produced by folding an edge portion of one member back over an edge portion of the other member. Examples of combinations of such sheet metal members are, in an automotive vehicle, inner and outer wall members of a door structure, a front fender and a front fender supporting hood, and an outer wall member and an associated reinforcing member of a trunk structure.

To assemble these sheet metal members by folding as mentioned above, it is a common practice to have one of the sheet metal members superimposed on the other and fold an edge portion of the former back over an edge portion of the latter so that the edge portions of the two members are in close contact with each other. In order that two sheet metal members combined in this manner are prevented from being displaced relative to each other from their initially fixed positions, it is important that the sheet metal member held by the folded sheet metal member be sufficiently tightly held by the folded member so that no gap exists between the edge of the edge portion of the former and the folded over end of the latter. Since, however, the dimensional accuracy usually varies from one sheet metal member to another where the sheet metal members are manufactured on a large-scale commercial basis, and for the purpose of achieving satisfactory productivity in the assembly of the sheet metal members as in the automotive industry, it is practically impossible to achieve a gap-free fit between sheet metal members which are combined by the prior art folding process. To prevent relative displacement between joined sheet metal members, the sheet metal members may be subjected to additional processing such as, for example, spot-welding or bonding with a metal-to-metal adhesive during the assembly operation to provide reinforcement for the lock joint produced in the assembled structure. If, however, the sheet metal members are spot-welded when they are being joined together, the members tend to be distorted and additional operations and equipment are necessitated to remedy the distortion of the members combined; especially with members which are oriented outwardly in working positions in a final product such as an automotive vehicle. To constantly achieve accuracy in spot-welding operations of a great number of workpieces, sustained maintenance and servicing efforts are indispensable of jigs used for the spot-welding operations. If, on the other hand, a metal-to-metal adhesive is used to reinforce the lock joint between the sheet metal members, it becomes difficult to maintain the initially fixed relative positions of the joined members throughout the succeeding steps of the assembly operation during which the adhesive applied to the members remains wet. Sheet metal members joined together using a metal-to-metal adhesive are thus still subject to relative displacement until they are painted and baked during the final stages of the assembly operation. The present invention contemplates elimination of all the above mentioned drawbacks which are inherent in joining edge portions of two sheet metal members by a prior art folding process.

It is accordingly an important object of the present invention to provide a method of tightly joining edge portions of two sheets in a gap-free manner without supplementary processing such as chemical bonding, welding, or the use of supplementary fasteners such as bolts or rivets.

The above and other objects features and advantages of the invention will become clear from the following description taken in conjunction with the accompanying drawings, in which.

Figure 4A:
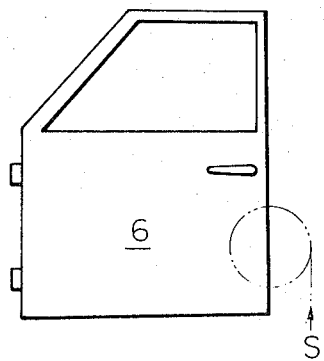
FIGS. 4a and 4b are plan views of a door assembly joined by a method of the invention.
Figure 4B:
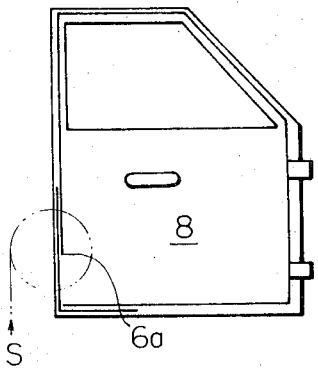

FIGS. 4a and 4b show an example of practical structural members joined by a method of the invention. An automobile door assembly includes a door 6 and a door inner panel 8 joined to the door 6. FIG. 4a shows the outside of the door 6 and FIG. 4b shows the inside of the door 6 and the inner panel 8. The methods of the invention relate to joining the inner panel 8 to the door 6 by folding an edge portion 6a of the door 6 back over the peripheral edge of the inner panel 8.

Figure 1:
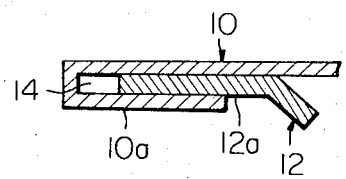
FIG. 1 is a cross sectional view of two sheet metal members whose edges are joined by a prior art folding method.
Figure 2:
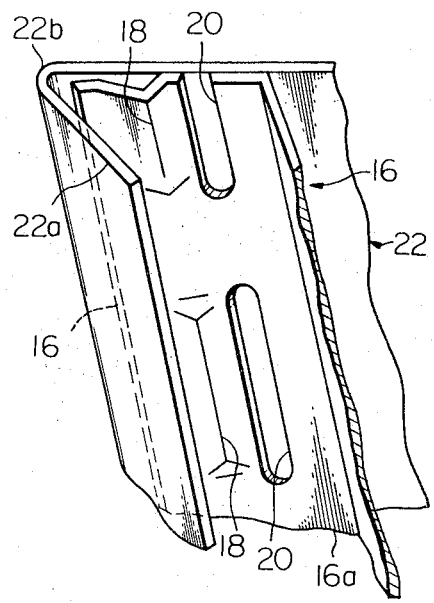
FIG. 2 is a perspective view of a preferred method of joining the edges of two sheets according to the invention.
Figure 3:
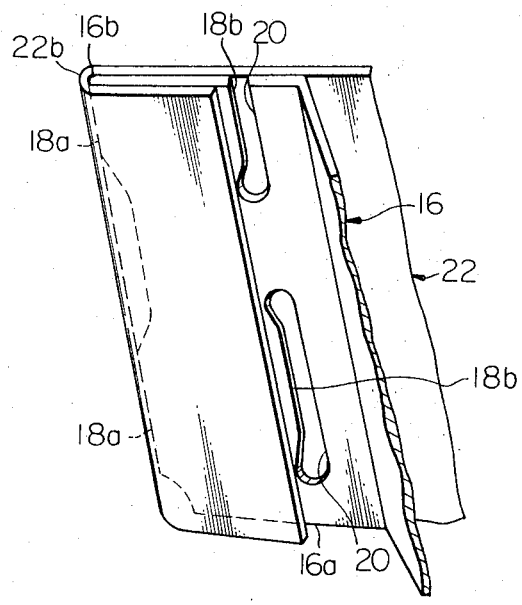
FIG. 3 is a perspective view of the sheets of FIG. 2 being tightly joined by the method of the invention.

FIGS. 4a and 4b are exemplary only, and the invention is not limited to automotive doors or other automotive structures. FIGS. 1 to 3 can be considered as illustrating methods of joining the inner panel 8 to the door 6 within a portion surrounded by a broken circle S.

As illustrated in FIG. 1, edge portions of sheet metal members 10 and 12 are joined by a conventional folding method so that an edge portion 10a of the sheet metal member 10 is folded back over an edge portion 12a of the other sheet metal member 12 so that the latter is tightly gripped by the former. For the reasons above, a gap 14 is inevitably produced between the inner surface of the folded end of the sheet metal member 10 and the edge of the edge portion 12a of the sheet metal member 12. The goal of the present invention is to join the edges of the sheet metal members 10 and 12 by a sufficiently tight and rigid lock joint which can be produced without the use of mechanical fasteners, metal-to-metal adhesives or spot-welding, and accordingly to eliminate the objectionable gap 14 that would otherwise be produced between the folded end of the sheet metal member 10 and the edge of the edge portion 12a of the sheet metal member 12.

FIGS. 2 and 3 show a method of the invention of joining the edges of two sheets 16 and 22, which are in the process of being joined in FIG. 2 and are fully joined in FIG. 3. An edge portion 16a of the sheet 16 is formed with a plurality of elongated raised portions 18 and slots 20. A slot 20 is provided for each raised portion 18, and the slots 20 and raised portions 18 are substantially parallel to an edge 16b of the sheet 16. Each raised portion 18 is provided between its respective slot 20 and the edge 16b, and the ends of each slot 20 extend symmetrically beyond the ends of the respective raised portions. The raised portions 18 and slots 20 may be formed in an integral operation with forming the basic shape of the sheet 16, which may correspond to the door inner panel 8 of FIG. 4 in which case the sheet 22 corresponds to the door 6, or may be formed separately as desired.

The sheets 16 and 22 are then placed together so that an edge portion 22a of the sheet 22 extends beyond the edge portion 16a of the sheet 16. The edge portion 22a is then partially folded back over the edge portion 16a as shown in FIG. 2 so that a predetermined gap is provided between the inner surface of a folded end 22b of the sheet 22 and the edge 16b of the sheet 16. The edge portion 22a is then completely and tightly folded back over the edge portion 16a as shown in FIG. 3. The partial and complete folding of the edge portion 22a back over the edge portion 16a may be done as two separate steps, or as a single continuous step as desired.

Upon complete folding, the raised portions 18 are flattened and sections 18a of the edge portion 16a between the raised portions 18 and the edge 16b deform parallel to the surface of the sheet 22 to fill the predetermined gap and engage with the inner surface of the folded end 22b of the sheet 22. In this way, the gap 14 of the prior art method of FIG. 1 is eliminated, and a rigid lock joint is provided in which the sheets are prevented from being relatively displaced perpendicular to the folded end 22b of the sheet 22. Sections 18b of the edge portion 16a between the raised portions 18 and the slots 20 also deform parallel to the surface of the sheet 22 to partially fill the slots 20 as shown in FIG. 3. In this configuration, only structural deformation of the sheet 16 in flattening the raised portions 18 is required, rather than elastic or plastic deformation of the sheet material itself. Also, due to the provision of the slots 20, a practical amount of manufacturing inaccuracy in providing the predetermined gap can be compensated for without supplementary procedures.

Although a sufficiently tight and strong lock joint is provided by a method of the invention without any supplementary means such chemical adhesives, welding, etc., these may be utilized if desired to make the lock joint even stronger within the scope of the invention.

What is claimed is:

1. A method of joining two sheets at their edges, comprising the steps of:
   a. forming an elongated slot through an edge portion of one sheet and an elongated raised portion on the same edge portion so that the slot and the raised portion are substantially parallel to the edge of the edge portion and the raised portion is formed between the slot and the edge of the edge portion;
   b. placing the sheets together so that the edge portion of the other sheet extends beyond the edge portion of the one sheet which was formed according to step a;
   c. partially folding the edge portion of the other sheet back over the edge portion of the one sheet so that a predetermined gap is provided between the edge of the edge portion of the one sheet and the inner surface of the folded end of the other sheet; and
   d. completely and tightly folding the edge portion of the other sheet back over the edge portion of the one sheet so that the raised portion is flattened and a section of the edge portion of the one sheet between the raised portion and the edge thereof deforms parallel to the surface of the other sheet to fill the gap and engage with the inner surface of the folded end of the other sheet, and a section of the edge portion of the one sheet between the raised portion and the slot thereof deforms parallel to the surface of the other sheet to partially fill the slot.

2. A method as claimed in claim 1, in which the elongated slot is longer than the elongated raised portion.

\* \* \* \* \*